United States Patent
Porikli et al.

(10) Patent No.: US 6,859,554 B2
(45) Date of Patent: Feb. 22, 2005

(54) METHOD FOR SEGMENTING MULTI-RESOLUTION VIDEO OBJECTS

(75) Inventors: Fatih M. Porikli, North Plainfield, NJ (US); Yao Wang, Matawan, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 609 days.

(21) Appl. No.: 09/826,333

(22) Filed: Apr. 4, 2001

(65) Prior Publication Data

US 2002/0176625 A1 Nov. 28, 2002

(51) Int. Cl.$^7$ .................................................. G06K 9/34
(52) U.S. Cl. ....................... 382/173; 382/164; 382/240; 382/262
(58) Field of Search ................................. 345/719, 723; 348/385.1, 390.1, 391.1; 375/240.02, 240.08, 240.1, 240.16, 240.19; 382/162–166, 171–180, 190, 199, 224, 225, 262–264, 282–283, 240

(56) References Cited

U.S. PATENT DOCUMENTS

| | | | | |
|---|---|---|---|---|
| 5,502,510 A | * | 3/1996 | Kim et al. | 348/701 |
| 5,592,231 A | * | 1/1997 | Clatanoff et al. | 348/452 |
| 5,604,822 A | * | 2/1997 | Pearson et al. | 382/199 |
| 5,793,895 A | * | 8/1998 | Chang et al. | 382/236 |
| 5,832,115 A | * | 11/1998 | Rosenberg | 382/199 |
| 5,852,683 A | * | 12/1998 | Jewel | 382/284 |
| 5,978,031 A | * | 11/1999 | Kim | 375/240.16 |
| 6,055,330 A | | 4/2000 | Eleftheriadis et al. | 382/154 |
| 6,112,112 A | * | 8/2000 | Gilhuijs et al. | 600/425 |
| 6,452,637 B1 | * | 9/2002 | Rudin et al. | 348/416.1 |
| 6,496,228 B1 | * | 12/2002 | McGee et al. | 348/700 |
| 6,529,202 B2 | * | 3/2003 | Wu | 345/593 |
| 6,603,484 B1 | * | 8/2003 | Frisken et al. | 345/622 |
| 2001/0038718 A1 | * | 11/2001 | Kumar et al. | 382/284 |

OTHER PUBLICATIONS

Rosenfeld & Kak, "Digital Image Processing," 2nd ed., vol. 2, 1982, Sect. 10.4.2.*

* cited by examiner

Primary Examiner—Bhavesh M. Mehta
Assistant Examiner—Yubin Hung
(74) Attorney, Agent, or Firm—Dirk Brinkman; Andrew J. Curtin

(57) ABSTRACT

A method for segmenting video objects in a video sequence that is composed of frames including pixels first assigns a feature vector to each pixel of the video. Next, selected pixels are identified as marker pixels. Pixels adjacent to each marker pixel are assembled into a corresponding a volume of pixels if the distance between the feature vector of the marker pixel and the feature vector of the adjacent pixels is less than a first predetermined threshold. After all pixels have been assembled into volumes, a first score and descriptors are assigned to each volume. At this point, each volume represents a segmented video object. The volumes are then sorted a high-to-low order according to the first scores, and further processed in the high-to-low order. Second scores, dependent on the descriptors of pairs of volumes are determined. The volumes are iteratively combined if the second score passes a second threshold to generate a video object in a resolution video object tree that completes when the combined volume or video object is the entire video.

12 Claims, 9 Drawing Sheets

| | | |
|---|---|---|
| Color mean (i.e. red) | $F_1(P_i)$ | $\frac{1}{N_i}\sum_{p_k \in P_i} R(p_k)$ |
| Volume | $F_2(P_i)$ | $\bigcup p_k,\ p_k \in P_i$ |
| Surface | $F_3(P_i)$ | $\sum_{p_k \in P_i,\ p_l \in P_j,\ i \neq j} p_k \cap p_l$ |
| Compactness – 1 | $F_4(P_i)$ | $F_2(P_i)/surface^2$ |
| Compactness – 2 | $F_5(P_i)$ | $F_2(P_i)/maxcord^2$ |
| Vertical motion | $F_6(P_i)$ | $x_{first,i} - x_{last,i}$ |
| Horizontal motion | $F_7(P_i)$ | $y_{first,i} - y_{last,i}$ |
| Route length | $F_8(P_i)$ | $\sum_t |T_i(t) - T_i(t-1)|$ |
| Average x position | $F_9(P_i)$ | $\frac{1}{N_i}\sum_{p_k \in P_i} x$ |
| Average y position | $F_{10}(P_i)$ | $\frac{1}{N_i}\sum_{p_k \in P_i} y$ |

| | | |
|---|---|---|
| Average distance | $F_{11}(P_i, P_j)$ | $\dfrac{1}{N_i \cap N_j} \sum_t \Delta d_{ij}(t)$ | 411 |
| Variance of distance | $F_{12}(P_i, P_j)$ | $\dfrac{1}{N_i \cap N_j} \sum_t \left(\Delta d_{ij}(t) - F_{11}(P_i, P_j)\right)^2$ | 412 |
| Maximum distance | $F_{13}(P_i, P_j)$ | $\max \Delta d_{ij}(t)$ | 413 |
| Average change in distance | $F_{14}(P_i, P_j)$ | $\dfrac{1}{N_i \cap N_j} \sum_t \left|\dfrac{\partial \Delta d_{ij}(t)}{\partial t}\right|$ | 414 |
| Direction difference | $F_{15}(P_i, P_j)$ | $\left\| |T_i(1) - T_i(N_i)| - |T_j(1) - T_j(N_j)| \right\|$ | 415 |
| Compactness ratio | $F_{16}(P_i, P_j)$ | $F_4(P_i \cup P_j) / F_4(P_i)$ | 416 |
| Mutual boundary | $F_{17}(P_i, P_j)$ | $F_3(P_i) + F_3(P_j) - F_3(P_i \cup P_j)$ | 417 |
| Mutual volume | $F_{18}(P_i, P_j)$ | $F_2(P_i) + F_2(P_j)$ | 418 |
| Color difference | $F_{19}(P_i, P_j)$ | $|F_1(P_i) - F_1(P_j)|$ | 419 |
| Coexistence | $F_{20}(P_i, P_j)$ | $\sum_t i_t \wedge j_t \quad \begin{cases} T_i(t) > 0 \Rightarrow i_t = 1 \\ T_j(t) > 0 \Rightarrow j_t = 1 \end{cases}$ | 420 |

400

Figure 4

METHOD FOR SEGMENTING MULTI-RESOLUTION VIDEO OBJECTS

RELATED APPLICATION

This application is related to U.S. patent application Ser. No. 09/826,048 "Method for Determining Compactness of Data and Signal Sets," filed by Porikli on Apr. 4, 2001.

FIELD OF THE INVENTION

The present invention relates generally to video processing, and more particular to video object segmentation.

BACKGROUND OF THE INVENTION

Older video standards, such as ISO MPEG-1 and MPEG-2, are relatively low-level specifications primarily dealing with the temporal and spatial compression of entire videos.

Newer video coding standards, such as MPEG-4 and MPEG-7, see "Information Technology—Generic coding of audio/visual objects," ISO/IEC FDIS 14496-2 (MPEG4 Visual), November 1998, allow arbitrary-shaped video objects to be encoded and decoded as separate video object planes (VOP's). These emerging standards are intended to enable multimedia applications, such as interactive video, where natural and synthetic materials are integrated, and where access is universal. For example, one might want to "cut-and-paste" a moving figure from one video to another. In order to identify the figure, the video must first be "segmented." It is possible to segment video objects under user control, i.e., semi-automatic, or unsupervised, i.e., fully automatically.

In the semi-automatic case, a user can provide a segmentation for the first frame of the video. The problem then becomes one of video object tracking. In the fully automatic case, the problem is to first identify the video object, then to track the object through time and space. Obviously, no user input is optimal.

With VOP's, each frame of a video is segmented into arbitrarily shaped image regions. Each VOP describes a video object in terms of, for example, shape, color, motion, and texture. The exact method of producing VOP's from the video is not defined by the above standards. It is assumed that "natural" objects are represented by shape information, in addition to the usual luminance and chrominance components. Shape data can be provided as a segmentation mask, or as a gray scale alpha plane to represent multiple overlaid video objects. Because video objects vary extensively with respect to low-level features, such as, optical flow, color, and intensity, VOP segmentation is a very difficult problem.

A number of segmentation methods are known. Region-based segmentation methods include mesh-based, motion model-based, and split-and-merge. Because these methods rely on spatial features, such as luminance, they may produce false object boundaries, and in some cases, foreground video objects may be merged into the background. More recently, morphological spatio-temporal segmentation has been used. There, information from both the spatial (luminance) and temporal (motion) domains are tracked using vectors. This complex method can erroneously assign a spatial region to a temporal region, and the method is difficult to apply to a video including more than one object.

Generally, unsupervised object segmentation methods can be grouped into three broad classes: (1) region-based methods that use a homogeneous color criterion, see M. Kunt, A. Ikonomopoulos, and M. Kocher, "Second generation image coding," Proc. IEEE, no.73, pp.549–574, 1985, (2) object-based approaches that use a homogeneous motion criterion, and (3) object tracking.

Although color-based methods work well in some situations, for example, where the video is relatively simple, clean, and fits the model well, they lack generality and robustness. The main problem arises from the fact that a single video object can include multiple different colors.

Motion-oriented segmentation methods start with an assumption that a semantic video object has homogeneous motion, see B. Duc, P. Schtoeter, and J. Bigun, "Spatio-temporal robust motion estimation and segmentation," Proc. 6th Int. Conf. Comput. Anall. Images and Patterns, pp. 238–245, 1995. These methods either use boundary placement schemes, or region extraction schemes, see J. Wang and E. Adelson, "Representing moving images with layers," IEEE Trans. Image Proc., no.3, 1994. Most of these methods are based on rough optical flow estimation, or unreliable spatio-temporal segmentation. As a result, these methods suffer from the inaccuracy of object boundaries.

The last class of methods for object segmentation uses tracking, see J. K. Aggarwal, L. S. Davis, and W. N. Martin, "Corresponding processes in dynamic scene analysis", Proc. IEEE, no.69, pp. 562–572, May 1981. However, tracking methods need user interaction, and their performance depends extensively on the initial segmentation. Most object extraction methods treat object segmentation as an inter- or intra-frame processing problem with some additional parametric motion model assumptions or smoothing constraints, and disregard 3D aspect of the video data.

Therefore, there is a need for a fully automatic method for precisely segmenting any number of objects in a video into multiple levels of resolution. The method should use both motion and color features over time. The segmentation should happen in a reasonable amount of time, and not be dependent on an initial user segmentation, nor homogeneous motion constraints.

SUMMARY OF THE INVENTION

The present invention provides a video object segmentation method that detects object boundaries precisely, without user assistance. A raw color or gray-scale video, or a processed video, e.g. with detected edges, successive-frame-difference, or texture score, is converted to a structure called a video-volume. Advanced 3D signal processing techniques are then applied to the volume.

The video is first filtered, the video volume is formed, and marker pixels are identified using, e.g., the color gradient of the pixel. A video volume is "grown" around each marker using color and texture distance criteria. Self-descriptors are assigned to volume, and mutual descriptors are assigned to pairs of similar volumes. These descriptors capture motion and spatial information of the volumes.

While applying and relaxing descriptor-based adaptive thresholds, similarity scores are determined for each possible pair-wise combination of volumes. The pair of volumes that gives the largest score is combined iteratively. In the combining stage, volumes are classified and represented in a multi-resolution coarse-to-fine hierarchy of video objects.

More specifically, the method according to the invention segments a video sequence of frames into video objects. Each frame is composed of pixels. Feature vector are assigned to each pixel of the video. Next, selected pixels are identified as marker pixels. Pixels adjacent to each marker pixel are assembled into a corresponding a volume of pixels if the distance between the feature vector of the marker pixel and the feature vector of the adjacent pixels is less than a first predetermined threshold.

After all pixels have been assembled into volumes, a first score and self-descriptors are assigned to each volume. At this point, each volume represents a segmented video object.

The volumes are then sorted a high-to-low order according to the first scores, and further processed in the high-to-low order.

Second scores, dependent on the descriptors of pairs of adjacent volumes are determined. The volumes are iteratively combined if the second score passes a second threshold to generate a video object in a resolution video object tree that completes when the combined volume or video object is the entire video.

BRIEF DESCRIPTION OF THE DRAWINGS

FIG. 3 is a block diagram of video volume self descriptors;

FIG. 4 is a block diagram of video volume mutual descriptors;

DETAILED DESCRIPTION OF THE PREFERRED EMBODIMENT

Color, Edge, and Difference-Map Video Volumes

Figure 1:
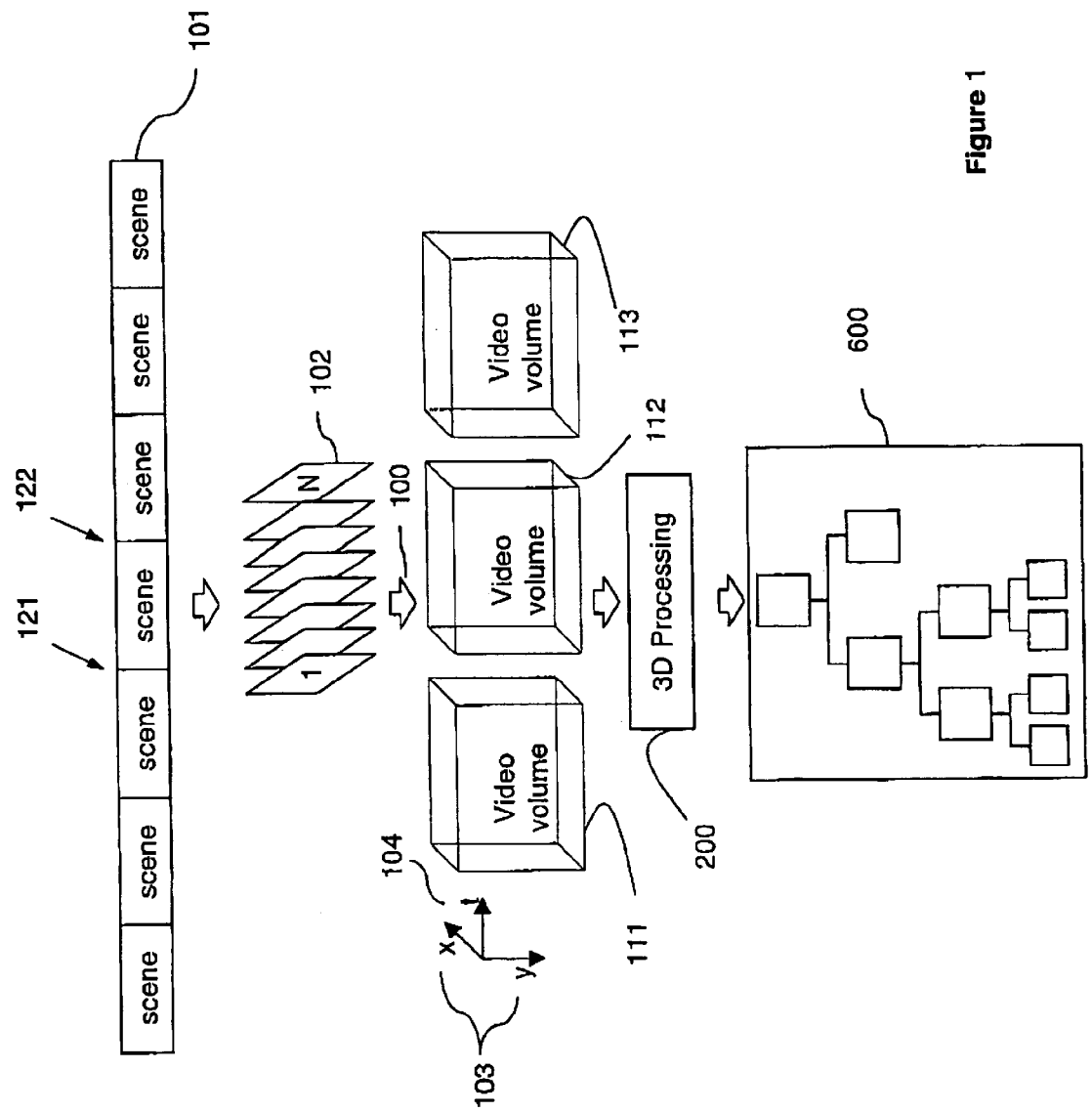
FIG. 1 is a block diagram of video volumes according to the invention.

As shown in FIG. 1, our invention arranges 100 scenes of a video 101, e.g., sequences of frames 1–N 102, into three-dimensional (3D) three-dimensional data structures V i.e., video volume 111–113. The color, edge, and difference-map volumes 111–113 have identical spatial (x, y) 104 and time (t) 104 axes. Then, we apply advanced 3D processing techniques 200 to the video volumes 111–113 to robustly segment video objects into a multi-resolution hierarchy 600.

A video volume $V(x,y,t)$ is defined as for a spatial-temporal collocated scene of the video 101 between two scene cuts 121–122. For a streaming video, the video volumes 111–113 can be generated for a certain number (N) of frames to allow overlap. This ensures object consistency within the volumes.

In case of moderate object motion, a portion of a video object in one frame intersects its projections on adjacent frames. Thus, object portions in the color-based video volumes have continuous silhouettes along the time axis t 104.

Object Segmentation

Figure 2:
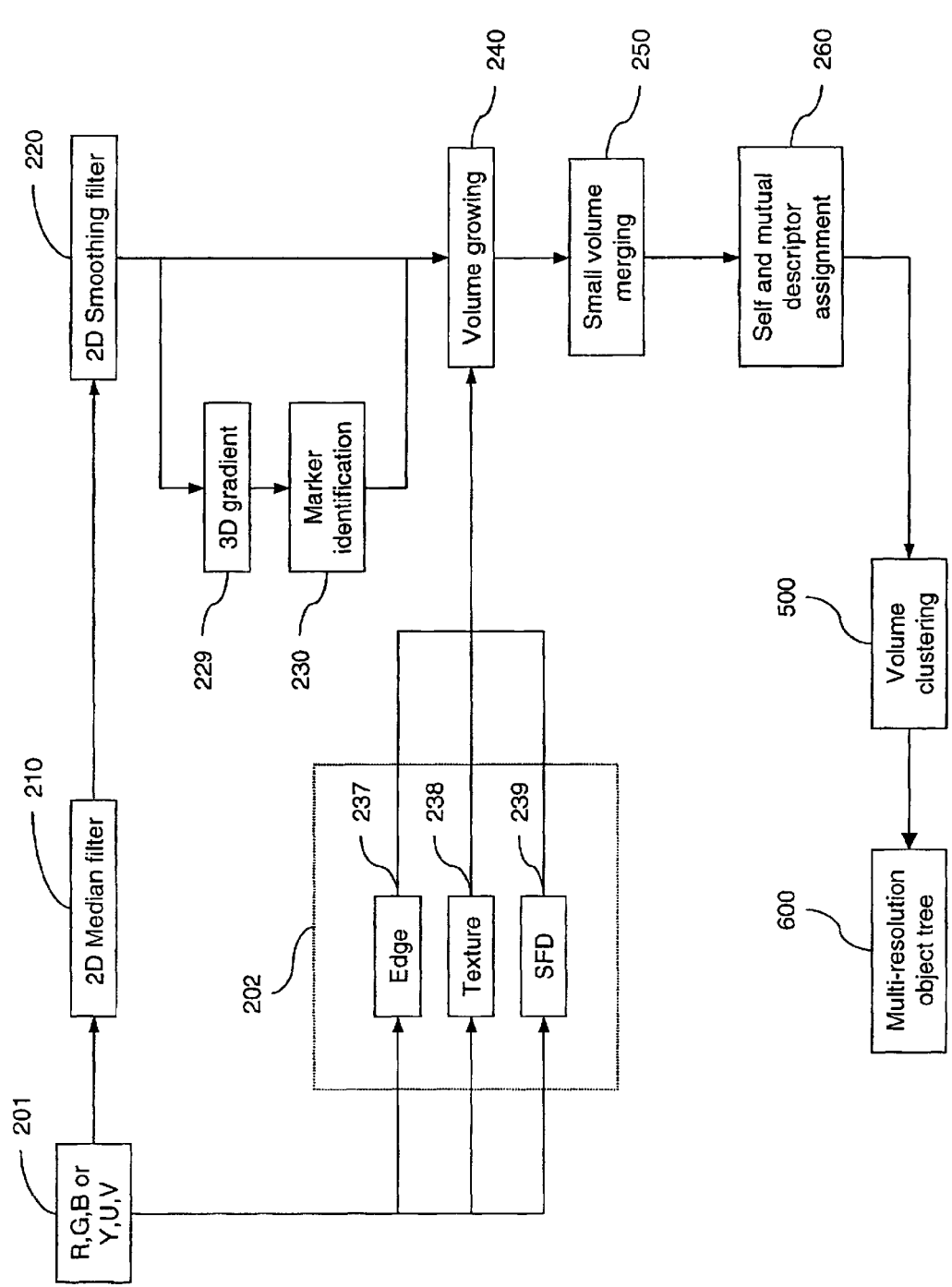
FIG. 2 is a flow diagram a video segmentation method according to the invention.

As shown in FIG. 2, the video volumes 111–113 can be formed from raw color data (R,G,B or Y,U,V) 201 in the frames 102, or from processed frames, i.e., including edges 237, texture scores 238, successive frame differences 239, etc. 202, hereinafter "features."

The frames 102 are indexed (1–N), and a 3×3 spatial-domain 2D median filter 210 is applied to the frames 102 in order to remove intensity singularities, without disturbing edge formation. We utilize a 2D median filter that exploits 2D coherence, and accelerates the computationally intensive filtering step.

We also determine two horizontally adjacent medians to reduce necessary comparisons described below. We prefer not to use a 3D median filter so that motion is preserved.

Fast Median Filtering

Figure 8:
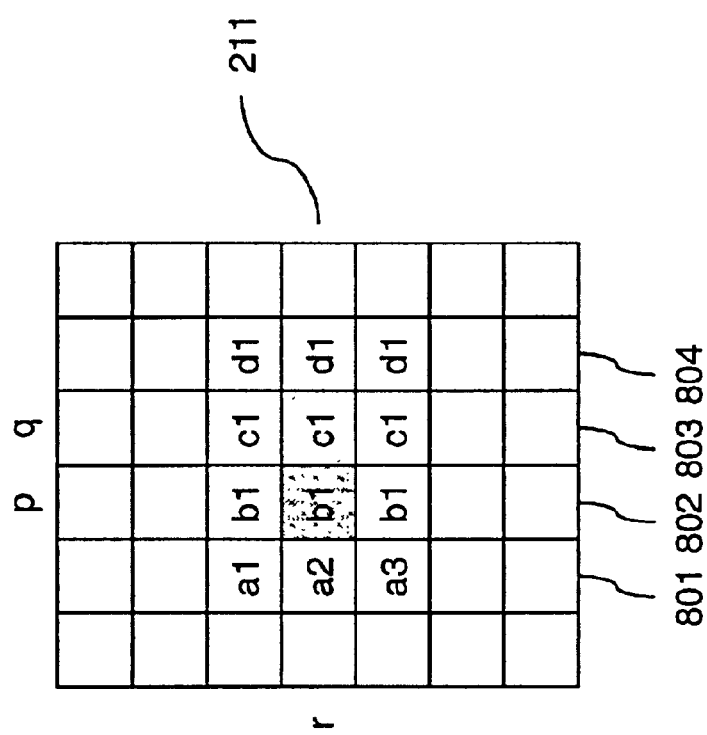
FIG. 8 is a diagram of fast 2-D median filtering done within 3×3 blocks.

FIG. 8 shows a fast median filter 211 that exploits 2-D coherence. Two horizontally adjacent medians are determined in a single step by reducing the necessary comparisons to find median ($5^{th}$ in a 9 elements list) within a 3×3 window from 30 to 9.5. First, the slices c 803 and d 804 are sorted as slices a 801 and b 802 of a previous step with six comparison. Sorting is done by a set of nested "if" conditions. Then, slices b 802 and c 803 are merged in a slice bc using five comparison. Slices a 801 and bc are merged to determine compute a median for p/r with four comparison. Finally, slices d 804 and bc are merged to determine a median for q/r with four comparison. In the worst case, this process takes a total of 19 comparisons.

To prevent over-segmentation in a volume growing step 240, described below, a 2D smoothing filter 220 is applied to the median filtered frames. We prefer a 2D Gaussian filter with a 5×5 spatial window. Again, a 3D filter is not used to preserve motion.

Marker Identification

The volume growing process 240 connects the pixels of $V(x,y,t)$ such that color and texture distributions of the connected pixels are uniform. Such grouped pixels, called volumes, are expanded from some seed pixels, called markers. The marker pixels $m_i$ can be selected from the pixels of the entire volume of pixels in three ways.

Uniformly Distributed Markers

The video volume V is divided into identical smaller volumes and the centers of the smaller volumes are selected as markers.

Minimum Gradient Markers with Fixed Neighborhood

A set S initially contains all possible spatio-temporal pixels of the volume V. For each pixel, a 3-D gradient $$\nabla V = \partial V/\partial x + \partial V/\partial y + \partial V/\partial t$$

is computed from the color components. Then, the pixel with the minimum gradient is identified 230 as a marker pixel. Pixels in a predetermined neighborhood around the marker are removed from the set S. The next minimum in the remaining set is chosen, and the identification process is repeated until no pixel remains in the set S.

Minimum Gradient Markers with Volume Growing

The minimum $m_i$ is chosen as above. Instead of removing the pixels adjacent to the marker pixel, a volume $P_i$ is assembled, according to $m_i = \arg\min \nabla V(x,y,t)_{r,g,b}$, $$S = V - \bigcup_{j=1}^{i} P_i,$$

until all the pixels of the volume are removed from the set S.

Assembling Volumes

The volumes $P_i$, $i=1,\ldots,M$ are assembled 240 around the markers $m_i$ pixels according to the features, e.g., color, texture, etc., similarity criteria. We assign a feature vector $m(x,y,t)$ to each pixel in the video volume $V(x,y,t)$. Minimally, the feature vector specifies the color components 201 of the pixel. Optionally, the feature vector can also include other data 202, such as texture scores 238 obtained by applying Gabor filters. If we only use the color feature, the feature vector $m_i$ for a marker pixel $m_i$ is $$m_i = [R(m_i), G(m_i), B(m_i)]^T$$

Distances d between feature vectors $n_j$ of adjacent pixels and the feature vector $m_i$ of marker $m_i$ are measured as $$d = \|m_i - n_j\|.$$

If the distance d is smaller then a predetermined threshold $\lambda$, then the adjacent pixel is included in the volume $P_i$, and the adjacent pixel is set as an active surface pixel for the volume $P_i$.

Next, the feature vector for the marker pixel is updated as $$d \leq t \Rightarrow \begin{cases} m_i^{k+1} = (N_i m_i^k + n_j)/(N_i + 1) \\ N_i = N_i + 1. \end{cases}$$

In the next iteration, the adjacent pixels of the active surface pixels are compared. This operation is repeated until all pixels in the video volume are processed. The above process assembles adjacent pixels with similar feature vectors as the marker pixel into the same volume. The location of each assembled volume is designated by the location of its marker pixel.

Small Volume Merging

Figure 9:
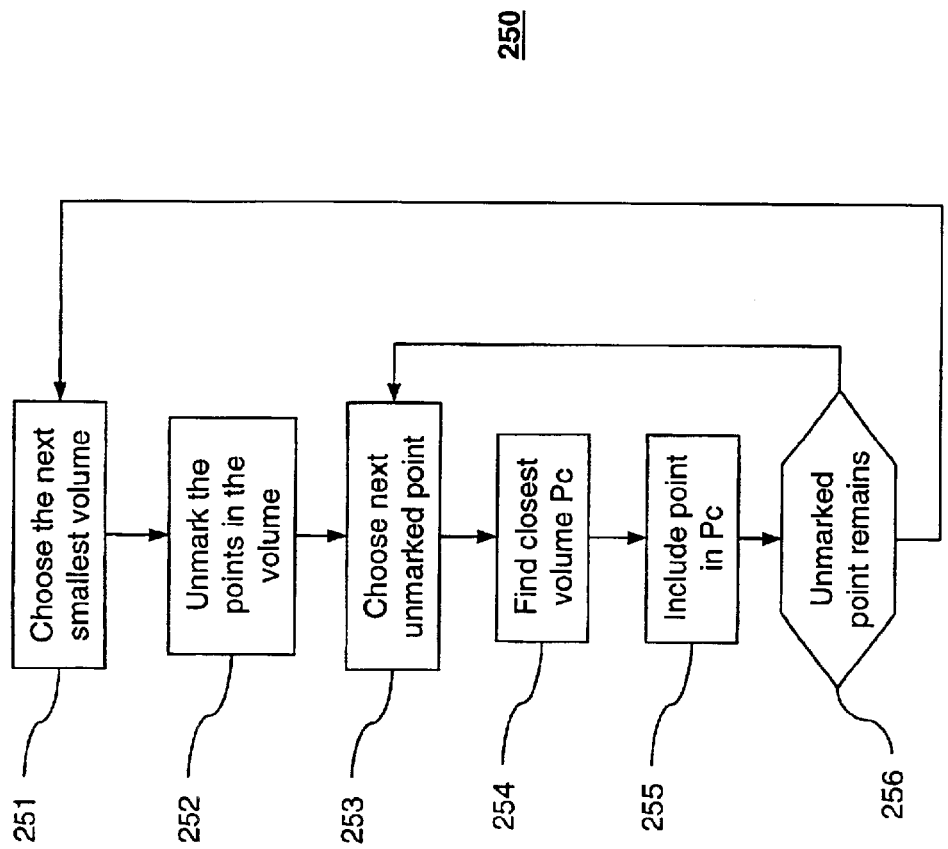
FIG. 9 is a flow diagram of small volume merging according to the invention.

Volumes that are less than a minimum size are merged 250 with adjacent volumes as shown in FIG. 9. For example, volumes less than 0.001 of the volume V, i.e., the entire video. To accelerate the searching process, the merging 250 is performed in a hierarchical manner by starting with the smallest volume, and ending with the largest volume that does not satisfy the minimum size requirement. The smallest volume that does not satisfy the requirement is chosen 251. All the pixels of the smallest volume are unmarked 252. Then, for each unmarked pixel, a closest volume $P_c$ located 254; and the pixel is included 255 in that volume. Steps 253–255 are repeated for all pixels, and all small volumes.

Volume Descriptors

Figure 7:
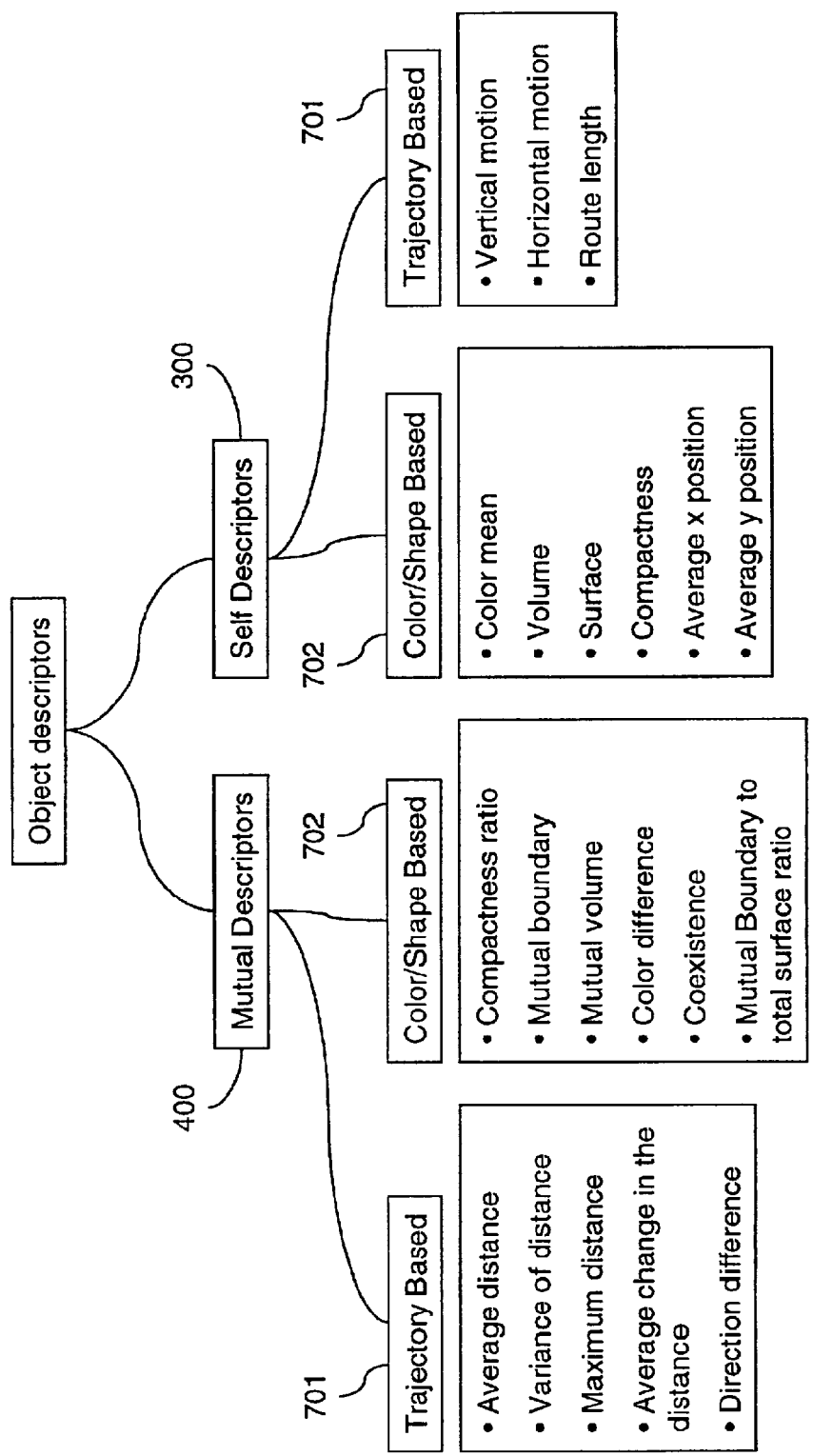
FIG. 7 is a block diagram of video volume self and mutual descriptors.

Next as shown in FIGS. 3, 4, and 7, we assign a set of self descriptors $F(P_i)$ 300 and a set of mutual descriptors $F(P_i, P_j)$ 400 to each volume $P_i$. These descriptors are used to identify the motion (trajectory) 701, shape or spatial and color 702 characteristics of the volumes, as well as the mutual correlation between any pair of volumes $P_i$, $P_j$. The descriptors 300 and 400 are assigned 260 as follows.

A trajectory $T_i$ is determined for each volume $P_i$ by averaging the vertical and horizontal coordinates of pixels inside the volume, frame-wise, as described below. Instead of averaging, other center-of-mass definitions can also be used. The self-descriptor $F_1(P_i)$ 300 is a vector that includes the color averages of the pixels in the volume. The color mean (average) 301 includes red, green, blue components for a RGB image, and hue, saturation, and intensity for a YUV image.

Self-Descriptors

The color of a pixel $p_k$ is denoted as $R(p_k)$, e.g., for the red color component. Then, $F_1(P_i)$ stands for the mean of the red color component. $F_2(P_i)$ 302 represents the number of pixels in the volume. $F_3(P_i)$ 303 is the number of pixels on the surface of the volume. A first compactness 304 is defined as a ratio of volume to squared surface is $F_4(P_i)$. A second compactness descriptor $F_5(P_i)$ 305 is defined by using maxcord instead of surface.

For further detail on the preferred compactness measure, please see U.S. patent application Ser. No. 09/826,048 "Method for Determining Compactness of Data and Signal Sets" filed by Porikli on Apr. 4, 2001, incorporated herein by reference.

Maxcord is the length of the longest cord that can fit in the volume. $F_6(P_i)$ and $F_7(P_i)$ 306–307 describe the trajectory of a volume in horizontal direction and vertical direction, respectively, for the sequence of frames. $F_8(P_i)$ 307 is the total length (route length) of the trajectory. $F_9(P_i)$ 309 and $F_{10}(P_i)$ 310 are averaged coordinates of the volume's pixels.

Mutual Descriptors

Mutual descriptors $F(P_i, P_j)$ 400 express the spatial, shape, motion, color relation between volumes. $F_{11}(P_i, P_j)$ 411 is the averaged distance between the trajectories of volumes $P_i$, $P_j$ by summing the distance of trajectories at each frame where both volumes exist. The variance of trajectory distance is $F_{12}(P_i, P_j)$ 412, and its maximum is $F_{13}(P_i, P_j)$ 413. Average change in distance $F_{14}(P_i, P_j)$ 414 stands for the accumulated distance change of trajectories between frames. Direction of a volume is the vector pointing from the volume's center-of-mass in the last frame to the center-of-mass of the volume in the frame where it existed. Direction difference $F_{15}(P_i, P_j)$ 415 is the distance of such two vectors associated with the volumes $P_i$, $P_j$. $F_{16}(P_i, P_j)$ 416 expresses the compactness of the mutual volume in terms of the average of their separate compactness scores. $F_{17}(P_i, P_j)$, $F_{18}(P_i, P_j)$ 417–418 are mutual volume and surface. $F_{19}(P_i, P_j)$ 419 is the color difference, and $F_{20}(P_i, P_j)$ 420 is the number of frames both volume coexists.

Volume Combining

The volumes are combined with respect to their descriptors in a clustering step 500 in order to segment the video into multi-resolution video objects. For each volume $P_1$, we determine a trajectory $T_i(t)=(x_t,y_t)$ by taking the spatial averages of the volume's pixels on a per frame basis.

$$T_i(t) = (x_t, y_t) = \frac{1}{N_i}\left(\sum_{p \in P_{i,t}} x, \sum_{p \in P_{i,t}} y\right).$$

Then, the distance $\Delta d_{ij}(t)$ between the trajectories of two volumes $P_i$ and $P_j$, at time t is $$\Delta d_{ij}(t) = |T_i(t) - T_j(t)|.$$

The motion information such as vertical and horizontal motion, route length, mean and variance of distance, direction difference, and average change in the distance are extracted from the trajectories. Therefore, without estimating motion by optical flow, parametric models or extensive search-based matching methods as in the prior art, our method uses the motion information efficiently.

Figure 5:
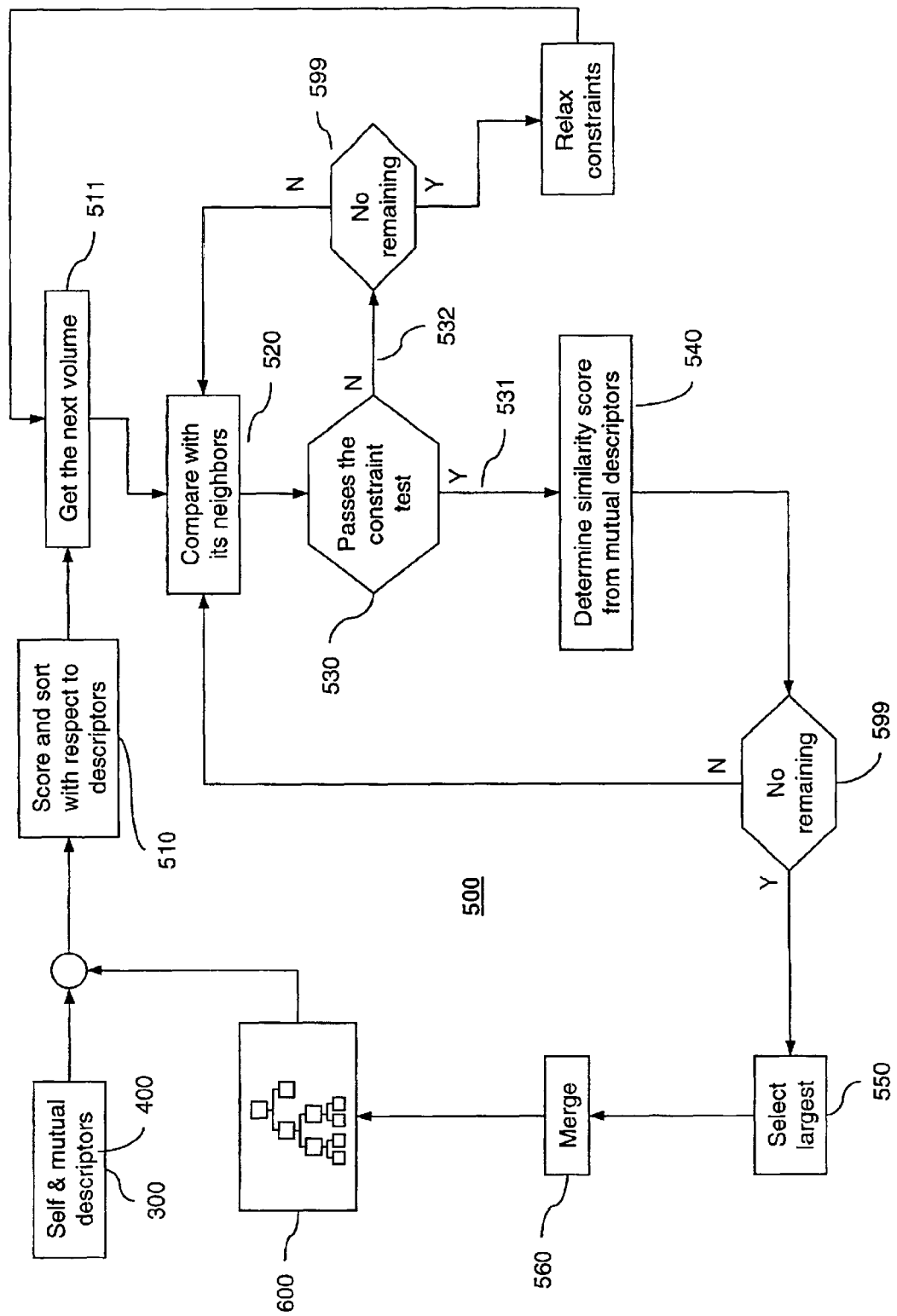
FIG. 5 is a flow diagram of a volume combining step of the method of FIG. 2.

As shown in FIG. 5, the clustering step 500 produces segmented video objects 600 by iteratively merging volumes having substantially similar pair of volumes descriptors 300, 400. First, the descriptors 300 of the volumes $P_i$ are scored 510 with respect to weighted averages of their sizes, compactness and existence values. The scored volumes are next sorted in a high-to-low order.

Starting with the first volume $P_i$ in the sorted list, each volume is processed as follows, until a single volume remains 599.

During the merging, the descriptors of the current volume 511 are compared 520 to the descriptors of its adjacent volumes. If their descriptors pass 530 a set of adaptively constraint thresholds $\tau_k$ k=10, . . . ,20, determine 540 a similarity score $$S(P_i,P_j)=\omega_1 F_{11}(P_i,P_j)+\omega_2 F_{12}(P_i,P_j)+\omega_3 F_{14}(P_i,P_j)+\omega_4 F_{15}(P_i,P_j)+\omega_5 F_{16}(P_i,P_j).$$

The size of the threshold defines resolution of the video objects that will be segmented.

If the descriptors of the adjacent volumes pass 531 the constraint tests 530, then the adjacent volume with the largest similarity score is selected 550 and combined 560 with the current volume 511, and the thresholding and combining continues with the next volume 511 in the sorted list. If no volumes are combined during an iteration, the thresholds are relaxed 570 using $$\tau(F_i)^{k+1} = \tau(f_i)^k \pm \alpha \frac{1}{|\max F_i - \min F_i|}.$$

Combining continues, until the similarity scores exceed the initial scores by a substantial margin, or no volumes remain.

Multi-Resolution Object Tree

Figure 6:
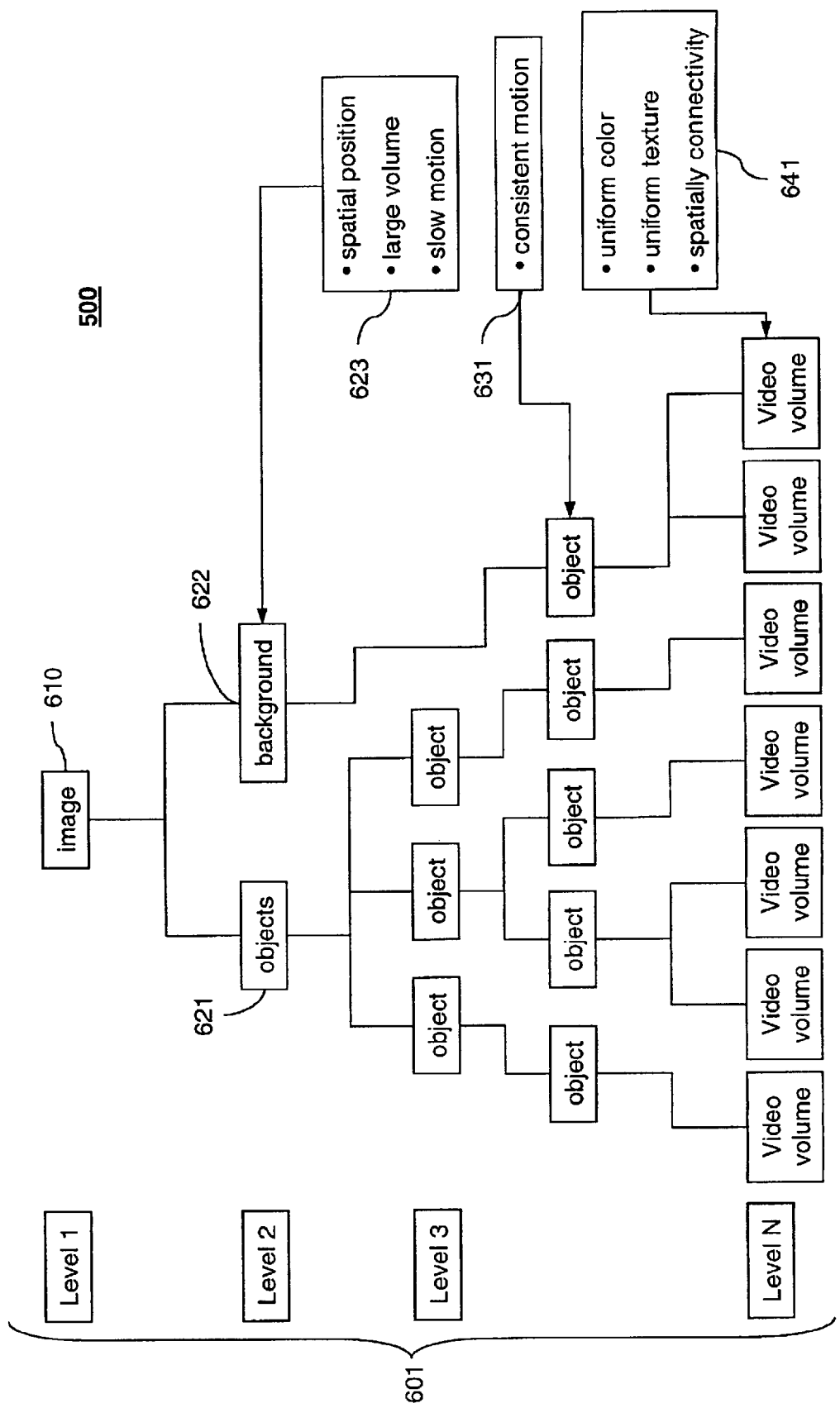
FIG. 6 is a multi-resolution video object tree produced by the method of FIG. 2.

As shown in FIG. 6, the volumes during the iterations of merging can be represented as nodes in a multi-resolution object tree having N levels 601, one level for each iteration. Level 1 represents the entire video, level 2 segments the video into moving video objects 621 and background 622. The background volume has slow motion over time, is consistent spatially, and relatively large 623 compared to the moving video objects 621. Lower in the multi-resolution tree, video objects with consistent motion video volumes are segmented 631. At the bottom level of the tree, i.e., level N, the video objects with uniform color, uniform texture, uniform shape, and spatial connectivity 641 are correctly segmented using the video volumes according to our invention.

Our method for segmenting video objects is robust, even when the motion of the video objects in the video is large. Moreover, our method is considerably faster than methods that rely on computing dense optical flows. The method enables a multi-resolution object representation of a finite depth because the segmentation self-terminates when the number of segmented video objects remains unchanged, unlike the prior art color, motion, and tracking based methods which may over-segment.

Although the invention has been described by way of examples of preferred embodiments, it is to be understood that various other adaptations and modifications may be made within the spirit and scope of the invention. Therefore, it is the object of the appended claims to cover all such variations and modifications that come within the true spirit and scope of the invention.

What is claimed is:

1. A method for segmenting a video including a plurality of pixels into a plurality of video objects, comprising:

assigning a feature vector to each pixel of the video;

identifying selected pixels of the video as marker pixels;

assembling each marker pixel and pixels adjacent to the marker pixel into a corresponding volume if the distance between the feature vector of the marker pixel and the feature vector of the adjacent pixels is less than a first predetermined threshold;

assigning a first score and descriptors to each volume;

sorting the volumes in a high-to-low order according to the first scores; and processing the volumes in the high-to-low order, the processing for each volume comprising:

comparing the descriptor of the volume to the descriptor of an adjacent volume to determine a second score;

combining the volume with the adjacent volume if the second score passes a second threshold to generate a video object in a multi-resolution video object tree; and repeating the comparing and combining steps until a single volume representing the video remains.

2. The method of claim 1 wherein each pixel has spatial (x,y) and time (t) coordinates to indicate a location of the pixel and the volumes in a spatial-temporal collocated overlapping scene of the video.

3. The method of claim 2 wherein the video includes a plurality of frames and further comprising:

projecting a portion of caclivideo object in a particular frame to intersect the projection of the video object in an adjacent frame to provide continuous silhouettes of the video object according to the time t coordinates.

4. The method of claim 3 further comprising:

applying a spatial-domain 2D median filter to the frames to remove intensity singularities, without disturbing edge formation.

5. The method of claim 1 further comprising:

partitioning the video into a plurality of identically sized volumes; and selecting the pixel at the center of each volume as the marker pixels.

6. The method of claim 1 further comprising:

determining a gradient magnitude $\nabla V=\partial V/\partial x+\partial V/\partial y+\partial V/\partial t$ for each pixel in the video;

selecting the pixel with a minimwn gradient magnitude as the marker pixel;

removing pixel in a predetermined neighborhood around the marker; and repeating the selecting and removing steps until no pixd remain.

7. The method of claim of claim 1 wherein the feature vector is based on a color of the pixel.

8. The method of claim 1 further comprising:

merging volumes less than minimum size with an adjacent volumes.

9. The method of claim 8 wherein the minimum size is less than 0.00 1 of the volume representing the video.

10. The method of claim 9 further comprising:

sorting the volumes in an increasing order to size;

processing the volumes in the increasing order, the processing for each volume comprising:

including each pixel of the volume in a closest volume until all volumes less than the minimum size are processed.

11. The method of claim 1 wherein the descriptors include self descriptors of the volume, and nmtual descriptors of the volume and the adjacent volume.

12. A method for segmenting a video sequence of frames, each frame including a plurality of pixels, comprising:

partitioning all of the pixels of all frames of the video into aplurality of volumes according to features of each pixel, the pixels of each volume having frame-based spatial coordinates and sequence-based temporal coordinates;

assigning descriptors to each volume;

representing each volume as a video object at a lowest level in a multi-resolution video object tree; and iteratively combining volumes according to the descriptors, and representing each combined volurm as a video object at intermediate levels of the multi-resolution video object tree, until all of the combined volumes form the entire video represented as a video object at a highest level of the multi-resolution video object tree.

* * * * *